(12) United States Patent
Talcott

(10) Patent No.: US 6,738,897 B1
(45) Date of Patent: May 18, 2004

(54) INCORPORATING LOCAL BRANCH HISTORY WHEN PREDICTING MULTIPLE CONDITIONAL BRANCH OUTCOMES

(75) Inventor: Adam R. Talcott, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 643 days.

(21) Appl. No.: 09/680,840

(22) Filed: Oct. 6, 2000

(51) Int. Cl.[7] .................................................. G06F 9/38
(52) U.S. Cl. ........................................ 712/240; 712/239
(58) Field of Search ................................ 712/234, 236, 712/238, 239, 240

(56) References Cited

U.S. PATENT DOCUMENTS

| | | |
|---|---|---|
| 5,687,360 A | 11/1997 | Chang |
| 5,864,697 A | 1/1999 | Shiell |
| 6,088,793 A | 7/2000 | Liu et al. |

OTHER PUBLICATIONS

Yeh, Tse–Yu and Platt, Yale, N., "A Comparison of Dynamic Branch Predictors that use Two Levels of Branch History", Department of Electrical Engineering and Computer Science, The University of Michigan; pp. 257–266, Undated.

Wallace, Steven and Bagherzadeh, Nader, "Multiple Branch and Block Prediction", Department of Electrical and Computer Engineering, University of California, Irvine; pp. 1–10, Undated.

PCT International Search Report dated May 8, 2002, 9 pages.

*Primary Examiner*—William M. Treat
(74) *Attorney, Agent, or Firm*—Osha Novak & May L.L.P.

(57) ABSTRACT

A method for improving prediction of an outcome for a branch instruction in a set of instructions includes storing local branch history data for the branch instruction, using the local branch history data to predict the outcome of the branch instruction, and speculatively updating the local branch history data with the predicted outcome of the branch instruction. An apparatus for improving prediction of an outcome for a branch instruction in a set of instructions includes a memory for storing local branch history data for the branch instruction and a processor for using the local branch history data to predict the outcome of the branch instruction and speculatively updating the local branch history data with the predicted outcome of the branch instruction.

24 Claims, 5 Drawing Sheets

INCORPORATING LOCAL BRANCH HISTORY WHEN PREDICTING MULTIPLE CONDITIONAL BRANCH OUTCOMES

BACKGROUND OF THE INVENTION

Figure 1:
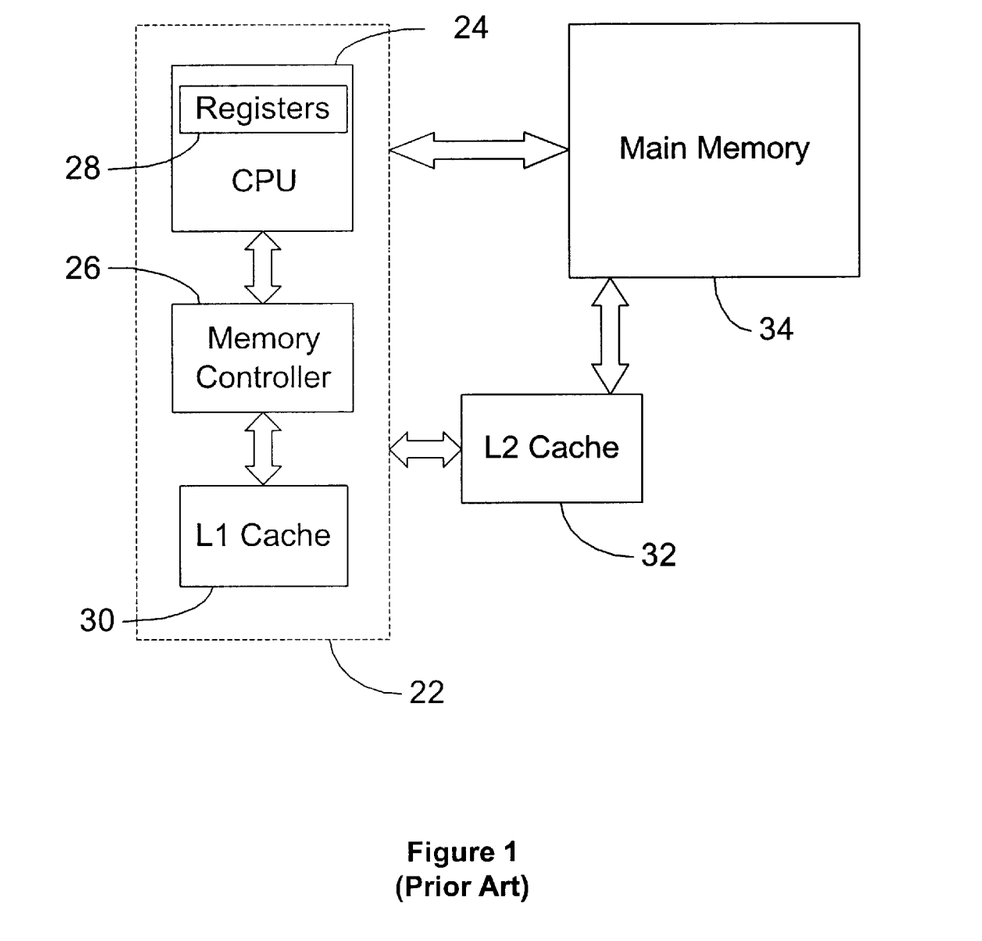
FIG. 1 shows a typical computer system.

Computer processors contain arithmetic, logic, and control circuitry that interpret and execute instructions from a computer program. Referring to FIG. 1, a typical computer system includes a microprocessor (22) having, among other things, a CPU (24), a memory controller (26), and an on-board cache memory (30). The microprocessor (22) is connected to external cache memory (32) and a main memory (34) that both hold data and program instructions to be executed by the microprocessor (22). Internally, the execution of program instructions is carried out by the CPU (24). Data needed by the CPU (24) to carry out an instruction are fetched by the memory controller (26) and loaded into internal registers (28) of the CPU (24). Upon command from the CPU (24), the memory controller (26) searches for the data first in the fast on-board cache memory (30), then in external cache memory (32), and finally in the slow main memory (34). Finding the data in the cache memory is referred to as a "hit." Not finding the data in the cache memory is referred to as a "miss."

The time between when a CPU requests data and when the data is retrieved and available for use by the CPU is termed the "latency" of the system. If requested data is found in cache memory, i.e., a data hit occurs, the requested data can be accessed at the speed of the cache and the latency of the system is reduced. If, on the other hand, the data is not found in cache, i.e., a data miss occurs, and thus the data must be retrieved from main memory for access and the latency of the system is increased.

In the pursuit of improving processor performance, designers have sought two main goals: making operations faster and executing more operations in parallel. Making operations faster can be approached in several ways. For example, transistors can be made to switch faster and thus propagate signals faster by improving semiconductor processes; execution-unit latency can be reduced by increasing the number of transistors in the design; and the levels of logic required by the design to implement a given function can be minimized to increase speed. To execute more operations in parallel, designers mainly rely on one, or a combination of pipelining and superscalar techniques. Pipelined processors overlap instructions in time on common execution resources. Superscalar processors overlap instructions in space on separate resources.

Pipeline stalls are a main performance inhibitor with regard to parallel processing. Stalls arise from data dependencies, changes in program flow, and hardware resource conflicts. At times, pipeline stalls can be avoided by rearranging the order of execution for a set of instructions. Compilers can be used to statically reschedule instructions. However, incomplete knowledge of run-time information reduces the effectiveness of static rescheduling. In-order processors, i.e., processors that issue, execute, complete, and retire instructions in strict program order, have to rely entirely on static rescheduling and thus are prone to pipeline stalls.

As a result, designers use out-of-order processors and seek to implement dynamic instruction rescheduling. The simplest out-of-order processors issue instructions in order but allow them to execute and complete out of order. Even these simple out-of-order processors require complex hardware to reorder results before the corresponding instructions are retired. A strict result order is not required from a data-flow perspective. However, such ordering is necessary to maintain precise exceptions and to recover from mispredicted speculative execution.

A well-known method of reordering is through the use of a reorder buffer, i.e., a buffer that maintains results until written to the register file in program order. Designers also use other types of reordering hardware, such as history buffers and future files. History buffers record source-operand history so the processor can backtrack to a precise architectural state and future files store the current state and the architectural state in separate register files allowing the processor to be restored to a precise checkpoint state.

Branch prediction and speculative execution are additional techniques used to reduce pipeline stalls. In a pipelined processor, the outcomes of branch instructions are often determined after subsequent instructions have been fetched. Using branch prediction schemes, microprocessors attempt to accurately predict whether or not a branch is taken based on how that branch has behaved previously. The aggregate behavior, or the average behavior over time, of the branch instruction is stored in a Branch Prediction Table ("BPT"). Given a branch instruction's aggregate behavior, the branch predictor, which resides in an instruction fetch unit, predicts the outcome of the branch instruction and then fetches instructions thereafter based on that prediction. For example, if the branch predictor predicts that a branch will be taken, then the processor fetches the instructions at the instruction address to which the predicted instruction branches. When the branch proceeds in the predicted direction, pipeline stalls are completely avoided. On the other hand, if the branch direction is mispredicted, all the instructions after the mispredicted instruction must be removed from the processor.

Modern microprocessors incorporate a variety of branch prediction schemes. These schemes usually fall under one of two broad classifications: static branch prediction and dynamic branch prediction. Static branch prediction occurs when a branch predictor makes predictions that are not based on the run-time behavior of branch instructions. Two such schemes are: "predict not taken" and "predict taken." In the "predict not taken" scheme, a branch is predicted as not taken, and the processor simply continues as if the branch did not exist. In the "predict taken" scheme, as soon as the branch is decoded and the target address of the next instruction is determined,. it is assumed that the branch is taken and the process continues with the fetching and executing of instructions at the target address.

Dynamic branch prediction, on the other hand, occurs when the processor responds to changes in a branch instruction's behavior while a program is executing. In other words, a dynamic branch prediction scheme provides a mechanism by which a processor can take into account the cumulative behavior of a branch instruction. In cases where there are more than one branch instruction in an instruction bundle, also known as a fetch bundle, some schemes may break the fetch bundle at the points where additional branch instructions reside.

Typically, dynamic branch prediction schemes are extended to predict multiple branches. The increasing number of instructions executed per cycle in high-performance microprocessors calls for the instruction fetch unit to fetch a correspondingly larger number of instructions each cycle. Fetching more instructions per cycle increases the likelihood that more than one branch prediction will need to be made each cycle to determine the next fetch address. Accordingly, a microprocessor handles multiple branch instructions through a multiple branch prediction scheme.

Multiple branch prediction schemes usually depend upon a fetch bundle address (FBA), i.e., the address of the first instruction fetched in a given cycle, to index all prediction structures for the fetched instruction bundle. Each branch to be predicted in the current fetch bundle uses information from the prediction structures indexed by the address of the bundle currently being fetched.

An index based upon the fetch bundle address has typically been used to select several prediction counters from which multiple branch predictions are made dependent upon the location of the branches in the fetch bundle. These counters may be simple two-bit counters with saturation. Typically, the counter is incremented when the branch instruction is taken and it is decremented when the instruction is not taken. For example, the branch instruction could be taken if the counter is in state 2 or 3, and not taken if the counter is in state 0 or 1. The saturation attribute inhibits the counter from recycling. For example, if the counter is in state 3 and a branch instruction is taken, the counter stays in state 3 and does not increment back to state 0. This mechanism attempts to predict branch instructions by gathering and representing the aggregate behavior of previous branch instructions. Improvements made to this mechanism include using branch history so that the processor recognizes repetitive patterns in previous branch instructions to predict later branch instructions.

Typically, branch history mechanisms are separated into two types: global branch history and local branch history. Global branch history pertains to the last g outcomes of executed branch instructions. Local branch history incorporates the last l outcomes of the current branch instruction.

Branch instructions can either be conditional or unconditional. All conditional branch instructions and most unconditional branch instructions can be incorporated into branch history registers. However, some unconditional branch instructions, such as call and return instructions, are usually not incorporated into branch history registers. Global branch history prediction schemes have been extended to predict the outcomes of multiple branch instructions. Additionally, in order to predict multiple conditional branch instructions simultaneously, the BPT is typically extended to contain several n-bit counters per entry. Depending on the location of branches in the current fetch bundle, the proper n-bit counters are referenced to make the multiple branch predictions.

SUMMARY OF THE INVENTION

In one aspect, a method for improving prediction of an outcome for a branch instruction in a set of instructions comprises storing local branch history data for the branch instruction, using the local branch history data to predict the outcome of the branch instruction, and speculatively updating the local branch history data with the predicted outcome of the branch instruction.

In one aspect, an apparatus for improving prediction of an outcome for a branch instruction in a set of instructions comprises a memory for storing local branch history data for the branch instruction and a processor for using the local branch history data to predict the outcome of the branch instruction and speculatively updating the local branch history data with the predicted outcome of the branch instruction.

Other advantages and features will become apparent from the following description, including the figures and the claims.

DETAILED DESCRIPTION

The present invention relates to a system for incorporating local branch history when predicting multiple branch instruction outcomes. The local branch history table ("LBHT") used by all local branch history based prediction schemes is extended to include multiple local branch histories per entry.

Figure 2:
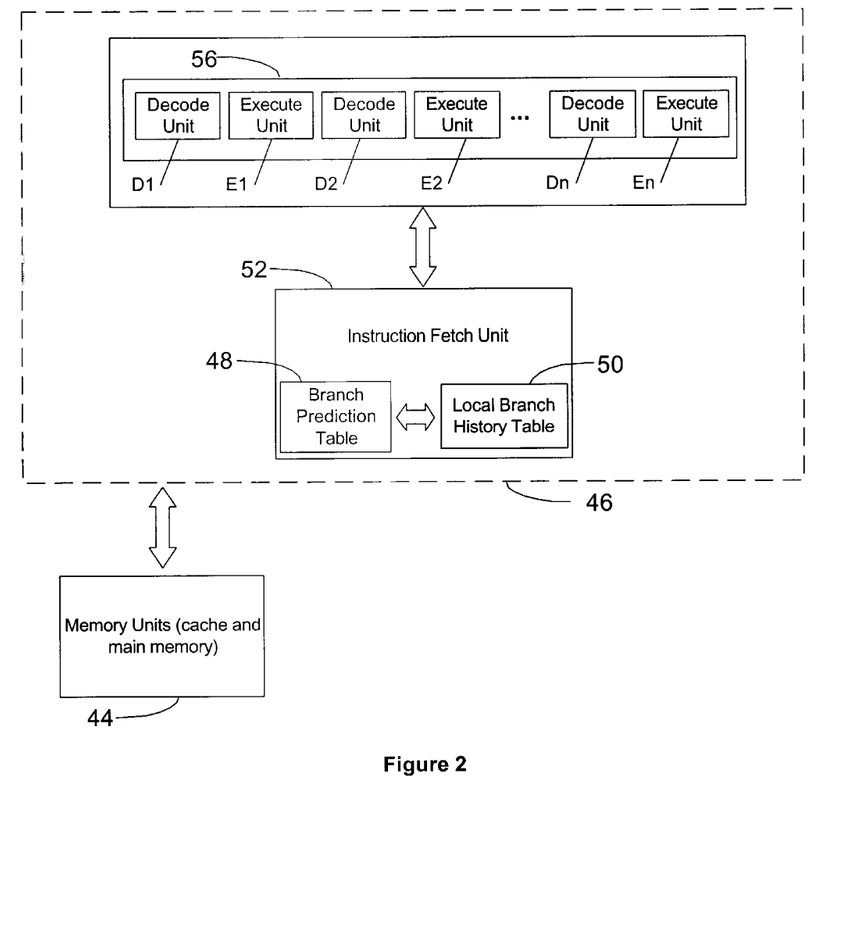
FIG. 2 shows a system in accordance with an embodiment of the present invention.

Referring to FIG. 2, a system in accordance with an embodiment of the present invention includes a microprocessor (46) having an instruction pipeline (56), and an instruction fetch unit (52) having a branch prediction table ("BPT") (48) and a local branch history table (50). Also, the system interfaces with memory units (44) similar to the microprocessor described in FIG. 1. The instruction pipeline (56) consists of a series of Decode units (D1 . . . Dn) and Execution units (E1 . . . En).

When a new fetch bundle needs to be fetched, the instruction fetch unit (52) reads out history information from the LBHT (50). The LBHT (50) information is then combined with the fetch bundle address to compute a pointer value into the BPT (48) in order to look up counter states for the instruction that the processor is attempting to fetch. As instructions become available to the pipeline (56), the pipeline (56) decodes and executes the instructions.

Figure 3:
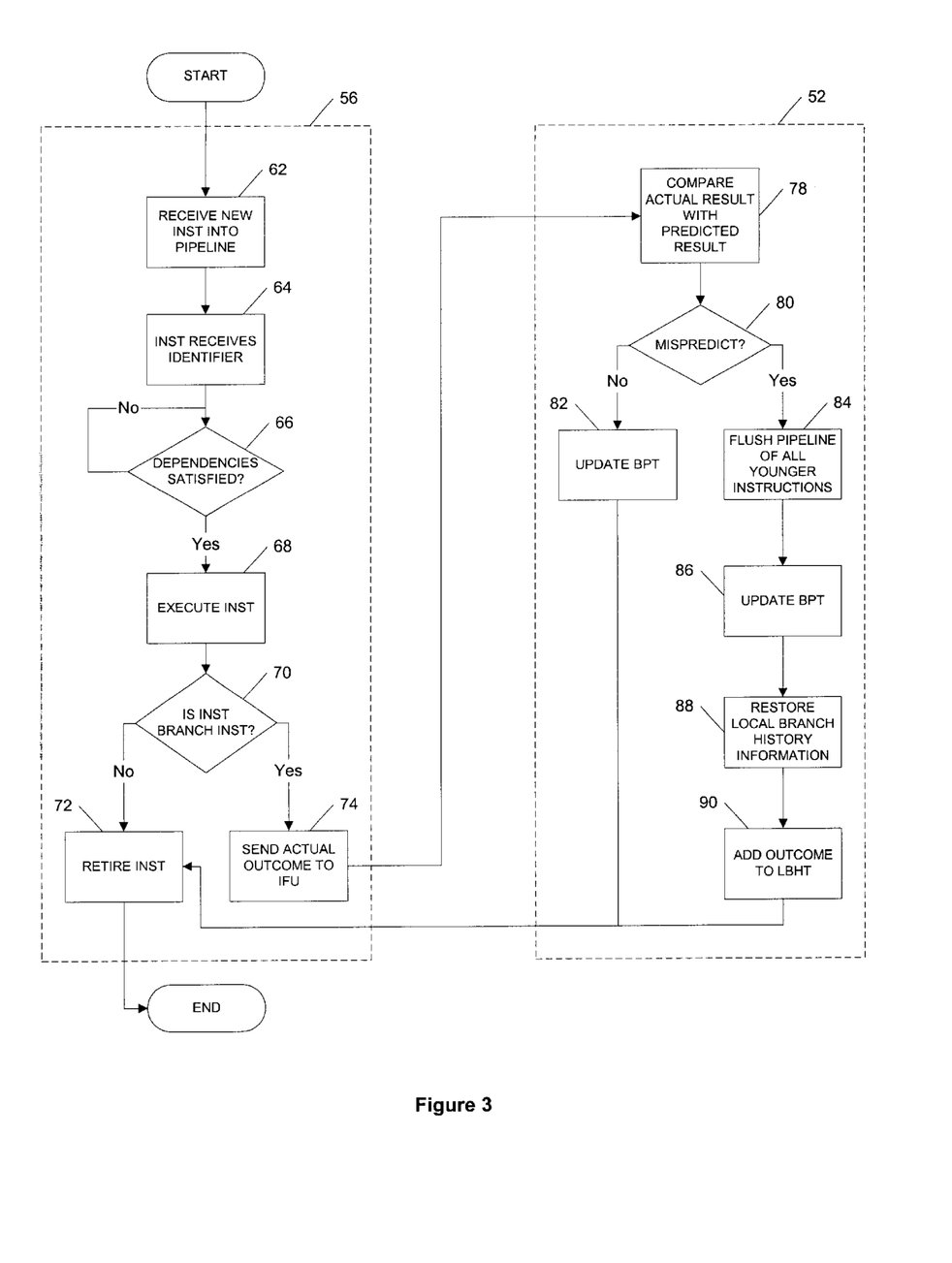
FIG. 3 shows a flow chart of an instruction handling process in accordance with an embodiment of the present invention.

FIG. 3 is a flow diagram of an exemplary instruction handling process in accordance with an embodiment of the present invention. The process proceeds in both the pipeline (56) and the instruction fetch unit (52). As a pipeline (56) receives a new instruction (step 62), the instruction receives an identifier that is used to track the instruction (step 64). Those skilled in the art will appreciate that other embodiments may have different means by which instructions are distinguished with respect to their entry time into the pipeline (56). Once an instruction is fed into the pipeline (56), and its dependencies have been satisfied (step 66), the pipeline executes the instruction (step 68).

In the case that the executed instruction is not a branch instruction (step 70), the instruction is retired (step 72), and the pipeline's handling of the instruction terminates. If the executed instruction is a branch instruction (step 70), then the actual outcome of the execution (or "resolution") of the branch instruction is sent to the instruction fetch unit (step 74). Then, the instruction fetch unit (52) compares the actual execution result with the predicted result (step 78).

If there is no misprediction (step 80), i.e., the branch predictor predicted correctly, then the branch prediction table entry used to make the prediction is updated (step 82) by incrementing or decrementing the counters which reside in the BPT, and the pipeline terminates its handling of the instruction once the instruction is retired (step 72). However, in the case of a misprediction (step 80), the pipeline must be flushed of all instructions younger than the mispredicted instruction (step 84). Thereafter, the actual outcome updates the BPT (step 86), the original local history information is restored (step 88), and the actual outcome is added to the LBHT (step 90) so that it now includes the behavior of the latest instruction. Because the pipeline is flushed after a misprediction, the pipeline must retrieve a new instruction bundle. Those skilled in the art will appreciate that the exemplary flow process shown in FIG. 3 is equally applicable to a plurality of instructions being processed in parallel. Further, while, for purposes of illustration, steps are depicted occurring in series, those skilled in the art will appreciate that, according to dependency, certain steps may occur simultaneously.

Figure 4:
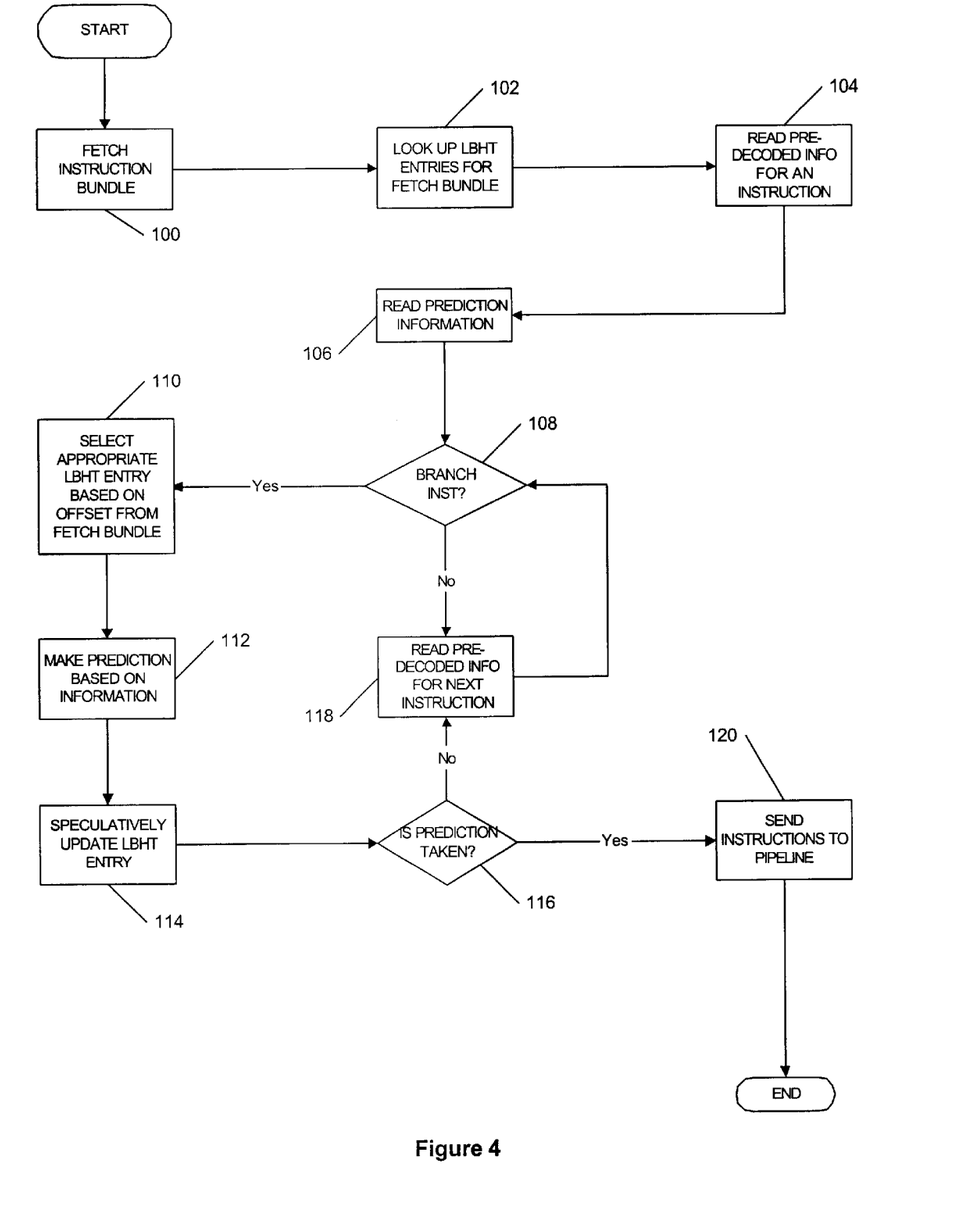
FIG. 4 shows a flow chart of a branch prediction process in accordance with an embodiment of the present invention.

FIG. 4 is a flow diagram of an exemplary branch prediction process in accordance with an embodiment of the present invention. As a microprocessor begins executing a program, the instruction fetch unit fetches an instruction bundle (step 100). Associated with the instruction bundle is a fetch bundle address, which serves as an index for the branch prediction structures. The instruction fetch unit looks up the local branch history entries for the fetch bundle (step 102). After the LBHT entries have been looked up, the processor reads the pre-decoded information for an instruction (step 104), and then reads the prediction information (step 106) for that instruction. The instruction fetch unit uses the pre-decoded information of the instruction to determine whether the instruction is a branch instruction (step 108). In the case that the instruction is not a branch instruction, the instruction fetch unit proceeds with reading the pre-decoded information of the next instruction (step 118) to determine whether the instruction is a branch (step 108). However, if the instruction is a branch instruction (step 108), then the processor must predict whether or not the branch should be taken.

In order to make that determination, the branch prediction scheme, i.e., the branch predictor, first selects the appropriate LBHT entry based on the offset from the start of the fetch bundle (step 110). This selection mechanism is employed so that for a particular instruction bundle, the nth instruction location in the bundle is associated with the nth local history in a LBHT entry. For example, assuming that there is an 8-instruction fetch bundle and 8 local histories in a particular LBHT entry, the first instruction associates with the first local history in the LBHT entry. Those skilled in the art will appreciate that other embodiments may use a different amount of local histories per LBHT entry.

The information in a LBHT entry includes local history information for the branch instruction being predicted, and this information is then combined with the instruction's fetch bundle address to retrieve the contents of the branch prediction table associated with the instruction (other architectures may use global history registers, branch history registers, and other architectural structures designed to contain the behavioral information and counts of a branch instruction). Thereafter, the branch predictor makes a prediction based on the retrieved information (step 112). After the prediction is made, the LBHT entry is speculatively updated (step 114) with new prediction information. Because of this, the next instruction using that LBHT entry, i.e., a branch instruction that maps to the same LBHT entry, is predicted based on updated information. Further, as described above, the LBHT entry may be updated after a branch instruction is resolved.

At this point, assuming that the branch is taken (step 116), the instructions up to and including the taken branch are sent to the pipeline (step 120). If, however, the branch is not taken, then the processor reverts back to reading the pre-decoded information for the next instruction in the fetch bundle (step 118). The flow process of FIG. 4 continues until the execution of the program is complete. Those skilled in the art will appreciate that the exemplary flow process shown in FIG. 4 is equally applicable to a plurality of instructions being processed in parallel. Further, while, for purposes of illustration, steps are depicted occurring in series, those skilled in the art will appreciate that, according to dependency, certain steps may occur simultaneously.

Figure 5:
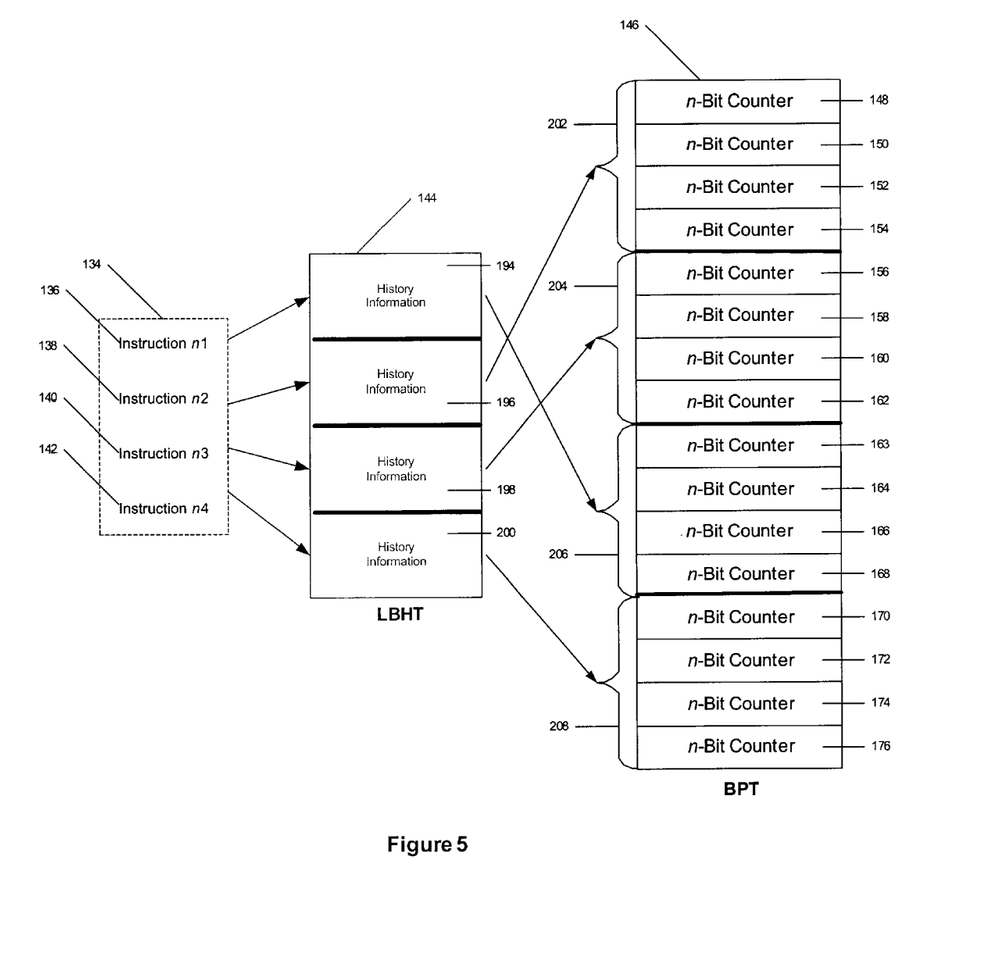
FIG. 5 shows a block diagram in accordance with an embodiment of the present invention.

Referring to FIG. 5, a block diagram in accordance with an embodiment of the present invention in which the instruction fetch unit handles four instructions (136, 138, 140, 142). Each instruction (136, 138, 140, 142) may or may not be a branch instruction. The processor associates each instruction to a particular local history (186, 188, 190, 192) in a LBHT entry (144) to retrieve historical information for each of the instructions.

Each local history (194, 196, 198, 200) contains history information about the instructions (136, 138, 140, 142). The LBHT history information is combined with the corresponding instruction's fetch bundle address to compute a value that points to a corresponding BPT entry. Those skilled in the art will appreciate that in other embodiments of the present invention, the instruction fetch unit may use any amount of fetch bundle address bits. For example, the instruction fetch unit may use zero fetch bundle address bits, and therefore, only the LBHT history information is used to compute the location of a corresponding BPT entry.

Each BPT entry (202, 204, 206, 208) contains the same amount of n-bit counters (148, 150, 152, 154, 156, 158, 160, 162, 163, 164, 166, 168, 170, 172, 174, 176) per BPT entry as the amount of local histories in the LBHT entry. In FIG. 5, for example, since there are four local histories (194, 196, 198, 200) in the LBHT entry (144), each BPT entry contains four n-bit counters. Thus, in effect, if four branches must be predicted simultaneously, then one BPT entry contains four, n-bit counters, and one LBHT entry contains four branch histories. This allows the processor to make predictions with regard to branch instructions within an entire bundle of instructions by considering the local branch histories of multiple instructions.

Advantages of the present invention may include one or more of the following. The incorporation of local branch histories in multiple branch prediction schemes combines the benefits of multiple branch predictors with the benefits of using local branch histories. Multiple branch predictors allow more instructions to be fetched in a given cycle since the instruction fetch unit can fetch across not taken branches. In other words, if a second branch instruction exists in a fetch bundle, the instruction fetch unit does not have to break the bundle. Local branch histories achieve a level of accuracy by the branch predictor which is relatively greater than global branch histories given the same amount of hardware. Additionally, the incorporation of local branch history structures require fewer history bits than global branch history structures with the same level of accuracy. In other words, the local history structures are much smaller than global history structures for the same level of performance.

In one or more embodiments of the present invention, a processor is allowed to consider the local branch histories of multiple instructions for which the processor is simultaneously predicting the outcomes. By allowing a processor to consider multiple branch histories, the processor can make more accurate predictions. Further, as the number of mispredictions decreases, processor performance increases.

While the present invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. A method for predicting an outcome of a branch instruction in a set of instructions having a plurality of branch instructions, comprising:
   accessing local branch histories for the plurality of branch instructions;
   using a local branch history associated with the branch instruction to access a branch prediction table entry, wherein an amount of predictors in the branch prediction table entry is related to an amount of the local branch histories;
   using information in the branch prediction table entry to predict the outcome of the branch instruction; and
   speculatively updating the local branch history with the predicted outcome of the branch instruction.

2. The method of claim 1, further comprising:
   predicting an outcome of a subsequent branch instruction associated with the local branch history using the speculatively updated local branch history.

3. The method of claim 1, further comprising:
   comparing the predicted outcome of the branch instruction to an actual outcome of the branch instruction; and
   selectively updating the local branch history based on the comparison between the predicted outcome of the branch instruction and the actual outcome of the branch instruction.

4. The method of claim 1, wherein the set of instructions is part of an instruction fetch bundle, the method further comprising:
   sending a plurality of instructions to an instruction pipeline including instructions preceding and including the predicted branch instruction.

5. The method of claim 4, further comprising:
   sending the plurality of instructions to the instruction pipeline including instructions preceding and including the predicted branch instruction along with the predicted outcome of the branch instruction.

6. The method of claim 1, further comprising:
   storing the local branch history in a local branch history table.

7. The method of claim 1, further comprising:
   using the local branch history to compute a pointer value; and
   looking up the branch prediction table entry corresponding to the pointer value.

8. The method of claim 7, further comprising:
   combining the local branch history with a fetch bundle address to compute the pointer value.

9. The method of claim 8, wherein the set of instructions is an instruction fetch bundle and the fetch bundle address is an address of a first instruction in the instruction fetch bundle.

10. The method of claim 7, wherein the branch prediction table entry comprises a counter having at least one bit.

11. The method of claim 7, wherein the branch prediction table entry comprises a plurality of counters each having at least one bit and the plurality of counters is equal in number to a number of the local branch histories.

12. The method of claim 1, further comprising:
    removing all instructions younger than the branch instruction based on comparison between the predicted outcome of the branch instruction and an actual outcome of the branch instruction.

13. An apparatus for predicting an outcome of a branch instruction in a set of instructions having a plurality of branch instructions, comprising:
    a memory comprising local branch history entries for the plurality of branch instructions; and
    a processor for:
      using information in a local branch history entry associated with the branch instruction to access a branch prediction table entry, wherein an amount of predictors in the branch prediction table entry is related to an amount of the local branch history entries;
      using the branch prediction table entry to predict the outcome of the branch instruction; and
      speculatively updating the local branch history entry with the predicted outcome of the branch instruction.

14. The apparatus of claim 13, wherein the processor predicts an outcome of a subsequent branch instruction associated with the local branch history entry using the speculatively updated local branch history entry.

15. The apparatus of claim 13 further comprising:
    a comparator for comparing the predicted outcome of the branch instruction to an actual outcome of the branch instruction,
    wherein the local branch history entry is selectively updated based on the comparison between the predicted outcome of the branch instruction and the actual outcome of the branch instruction.

16. The apparatus of claim 13, wherein the set of instructions is part of an instruction fetch bundle, the apparatus further comprising:
    an instruction pipeline for receiving a plurality of instructions,
    wherein the plurality of instructions comprises:
      the predicted branch instruction; and
      instructions preceding the predicted branch instruction.

17. The apparatus of claim 16, wherein the plurality of instructions sent to the instruction pipeline further comprises:
    the predicted outcome of the branch instruction.

18. The apparatus of claim 13, further comprising:
    a local branch history table for storing the local branch history entries.

19. The apparatus of claim 13, further comprising:
    a pointer value computed using the local branch history entry,
    wherein the branch prediction table entry corresponds to the pointer value.

20. The apparatus of claim 19, further comprising:
    a fetch bundle address that is combined with the local branch history entry to compute the pointer value.

21. The apparatus of claim 20, wherein the set of instructions is an instruction fetch bundle and the fetch bundle address is an address of a first instruction in the instruction fetch bundle.

22. The apparatus of claim 19, wherein the branch prediction table entry comprises a counter having at least one bit.

23. The apparatus of claim 19, wherein the branch prediction table entry comprises a plurality of counters each having at least one bit and the plurality of counters is equal in number to a number of the local branch history entries.

24. The apparatus of claim 13, wherein all instructions younger than the branch instruction are removed from the processor based on a comparison between the predicted outcome of the branch instruction and an actual outcome of the branch instruction.

* * * * *

UNITED STATES PATENT AND TRADEMARK OFFICE
CERTIFICATE OF CORRECTION

PATENT NO. : 6,738,897 B1
DATED : May 18, 2004
INVENTOR(S) : Adam R. Talcott

It is certified that error appears in the above-identified patent and that said Letters Patent is hereby corrected as shown below:

Column 7,
Line 43, please replace "history" with -- histories --;
Line 65, after "on", insert -- a --.

Signed and Sealed this

Seventeenth Day of August, 2004

JON W. DUDAS
*Acting Director of the United States Patent and Trademark Office*